United States Patent
Lin et al.

(10) Patent No.: US 8,925,879 B2
(45) Date of Patent: Jan. 6, 2015

(54) HORIZONTAL TYPE DISPLAY DEVICE

(75) Inventors: Chiung-Chi Lin, Taipei (TW); Chin-Chang Chang, Taipei (TW)

(73) Assignee: Flytech Technology Co., Ltd., Taipei (TW)

(\*) Notice: Subject to any disclaimer, the term of this patent is extended or adjusted under 35 U.S.C. 154(b) by 102 days.

(21) Appl. No.: 13/470,293

(22) Filed: May 12, 2012

(65) Prior Publication Data

US 2013/0299647 A1 Nov. 14, 2013

(51) Int. Cl.
*A47F 5/00* (2006.01)

(52) U.S. Cl.
USPC ........ 248/122.1; 248/121; 248/126; 248/130; 248/919

(58) Field of Classification Search
USPC .............. 248/122.1, 121, 126, 127, 130, 133, 248/140, 200, 917, 918, 919, 920, 921, 922, 248/923, 441.1, 444.1, 447.2, 154, 371, 248/393, 395, 229.1, 229.15, 229.2, 229.25
See application file for complete search history.

(56) References Cited

U.S. PATENT DOCUMENTS

| | | | | |
|---|---|---|---|---|
| 5,615,854 | A * | 4/1997 | Nomura et al. | 248/287.1 |
| 6,170,408 | B1 * | 1/2001 | Gombrich | 108/90 |
| 6,499,704 | B2 * | 12/2002 | Oddsen, Jr. | 248/125.1 |
| 6,967,632 | B1 * | 11/2005 | Minami et al. | 345/1.3 |
| 7,178,765 | B2 * | 2/2007 | Huang | 248/122.1 |
| 7,182,301 | B1 * | 2/2007 | Oddsen et al. | 248/122.1 |
| 7,369,401 | B1 * | 5/2008 | Floersch et al. | 361/679.27 |
| 7,542,270 | B2 * | 6/2009 | Chen | 361/679.25 |
| 7,567,436 | B2 * | 7/2009 | Jeong | 361/679.22 |
| 7,665,699 | B2 * | 2/2010 | Oddsen et al. | 248/224.7 |
| 7,673,844 | B2 * | 3/2010 | Zhang et al. | 248/372.1 |
| 7,731,137 | B2 * | 6/2010 | Lee et al. | 248/157 |
| 7,770,848 | B2 * | 8/2010 | Johnson et al. | 248/65 |
| 7,806,378 | B2 * | 10/2010 | Oddsen, Jr. | 248/280.11 |
| 7,832,058 | B2 * | 11/2010 | Wang et al. | 16/367 |
| 7,984,881 | B2 * | 7/2011 | Liu et al. | 248/121 |
| 8,199,472 | B2 * | 6/2012 | Shen et al. | 361/679.21 |
| 8,199,473 | B2 * | 6/2012 | Zhou | 361/679.22 |
| 8,251,334 | B2 * | 8/2012 | Zhang et al. | 248/372.1 |
| 8,488,306 | B2 * | 7/2013 | Mickey et al. | 361/679.04 |
| 2004/0011938 | A1 * | 1/2004 | Oddsen, Jr. | 248/393 |
| 2005/0029414 | A1 * | 2/2005 | Jeong | 248/122.1 |
| 2006/0108483 | A1 * | 5/2006 | Wolff et al. | 248/122.1 |
| 2007/0125914 | A1 * | 6/2007 | Liou et al. | 248/122.1 |
| 2007/0152111 | A1 * | 7/2007 | Tang et al. | 248/122.1 |
| 2007/0205340 | A1 * | 9/2007 | Jung | 248/125.9 |
| 2011/0075350 | A1 * | 3/2011 | Lindblad et al. | 361/679.41 |
| 2012/0273630 | A1 * | 11/2012 | Gillespie-Brown et al. | 248/122.1 |

\* cited by examiner

*Primary Examiner* — Monica Millner
(74) *Attorney, Agent, or Firm* — Li & Cai Intellectual Property (USA) Office (57) ABSTRACT

A horizontal type display device includes a base unit, a first support unit, a display unit, a second support unit and a hinge unit. The base unit includes a base body. The first support unit includes a vertical support structure vertically disposed on the base body. The display unit includes a display screen disposed above the base body and beside the vertical support structure. The second support unit includes a horizontal support structure horizontally connected between the vertical support structure and the display screen. The horizontal support structure has a first end portion inserted and fixed in the vertical support structure. The hinge unit includes a hinge structure disposed inside the display screen and connected to a second end portion of the horizontal support structure. The view angle of the display screen can be adjustable through the hinge structure that is connected to the display screen.

8 Claims, 8 Drawing Sheets

HORIZONTAL TYPE DISPLAY DEVICE

BACKGROUND OF THE INVENTION

1. Field of the Invention

The instant disclosure relates to a display device, and more particularly, to a horizontal type display device.

2. Description of Related Art

Because LCDs are thin, light, and small, and consume a small amount of power, LCDs are widely applied to information apparatus. In order to allow a user to view the display at the best possible viewing angle, there is a hinge assembly between the display panel and the base of the LCD. The hinge assembly can support the LCD and allows the viewing angle to be adjusted.

The prior art disclosures a hinge assembly including a connecting base, a bottom board, a rotating element, and two locking elements. The connecting base is a U-shaped board. The bottom of the connecting base is connected with the bottom board via a plurality of screws. Therefore, the connecting base utilizes the bottom board to connect to the base of the LCD. Ear parts and extend from two sides of the connecting base and the rotating element respectively. The two locking elements insert within the two ear parts of the connecting base respectively, the two ear parts of the rotating element and a plurality of washers, and are fastened to the locking element via the nuts. Therefore, the connecting base is pivoted to the rotating element. The display panel of the LCD is connected to the rotating element so that the display panel is pivoted to the base via the hinge assembly. Thereby, the display panel can be adjusted forwards and backwards. However, the hinge assembly of the prior art needs a bottom board to be installed in the bottom of the connecting base, and a plurality of screws are required to connect the connecting base and the bottom board. The structure is complex, the quantity of required elements is large, and the cost of the materials is high. Besides, the assembling tolerance is large, and the yield rate is low.

Further, the prior art discloses a supporting apparatus for a display. The supporting apparatus includes a body and two supporting frames. The body has two ear parts. Each of the ear parts has a through hole. The side wall of at least one of the through holes has a thread. Each of the supporting frames has a fastening shaft. On an outside surface of at least one fastening shaft, there is a thread corresponding to the thread of the side wall of the through hole. The fastening shafts insert within the through holes respectively. The supporting apparatus for a display further includes a plurality of washers and board-shaped springs. The washers and the board-shaped springs are respectively located at the fastening shafts. Two sides of the board-shaped springs respectively lean against the washers and the ear parts.

SUMMARY OF THE INVENTION

One aspect of the instant disclosure relates to a horizontal type display device for adjusting the view angle of the display screen relative to the at least one base body by using the hinge structure.

One of the embodiments of the instant disclosure provides a horizontal type display device, comprising: a base unit, a first support unit, a display unit, a second support unit and a hinge unit. The base unit includes at least one base body. The first support unit includes a vertical support structure vertically disposed on the at least one base body. The display unit includes a display screen disposed above the at least one base body and beside the vertical support structure. The second support unit includes a horizontal support structure horizontally connected between the vertical support structure and the display screen, wherein the horizontal support structure has a first end portion inserted and fixed in the vertical support structure. The hinge unit includes a hinge structure disposed inside the display screen and connected to a second end portion of the horizontal support structure, wherein the display screen is connected to the hinge structure, and the view angle of the display screen relative to the at least one base body is adjustable by using the hinge structure.

Another one of the embodiments of the instant disclosure provides a horizontal type display device, comprising: a base unit, a first support unit, a second support unit, a hinge unit and a display unit. The base unit includes at least one base body. The first support unit includes a vertical support structure vertically disposed on the at least one base body. The second support unit includes a horizontal support structure horizontally connected to the vertical support structure, wherein the horizontal support structure has a first end portion inserted and fixed in the vertical support structure. The hinge unit includes a hinge structure connected to a second end portion of the horizontal support structure. The display unit includes a display screen enclosing one part of the horizontal support structure and the hinge structure, wherein the display screen is connected to the hinge structure and the horizontal support structure, and the view angle of the display screen relative to the at least one base body is adjustable by using the hinge structure.

Therefore, the horizontal support structure is horizontally connected between the vertical support structure and the display screen and the hinge structure is disposed inside the display screen and connected to a second end portion of the horizontal support structure, thus the view angle of the display screen relative to the at least one base body can be adjusted by using the hinge structure according to different requirements.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Referring to FIG. 1 to FIG. 8, where the instant disclosure provides a horizontal type display device, comprising: a base unit 1, a first support unit 2, a display unit 3, a second support unit 4 and a hinge unit 5.

Figure 1:
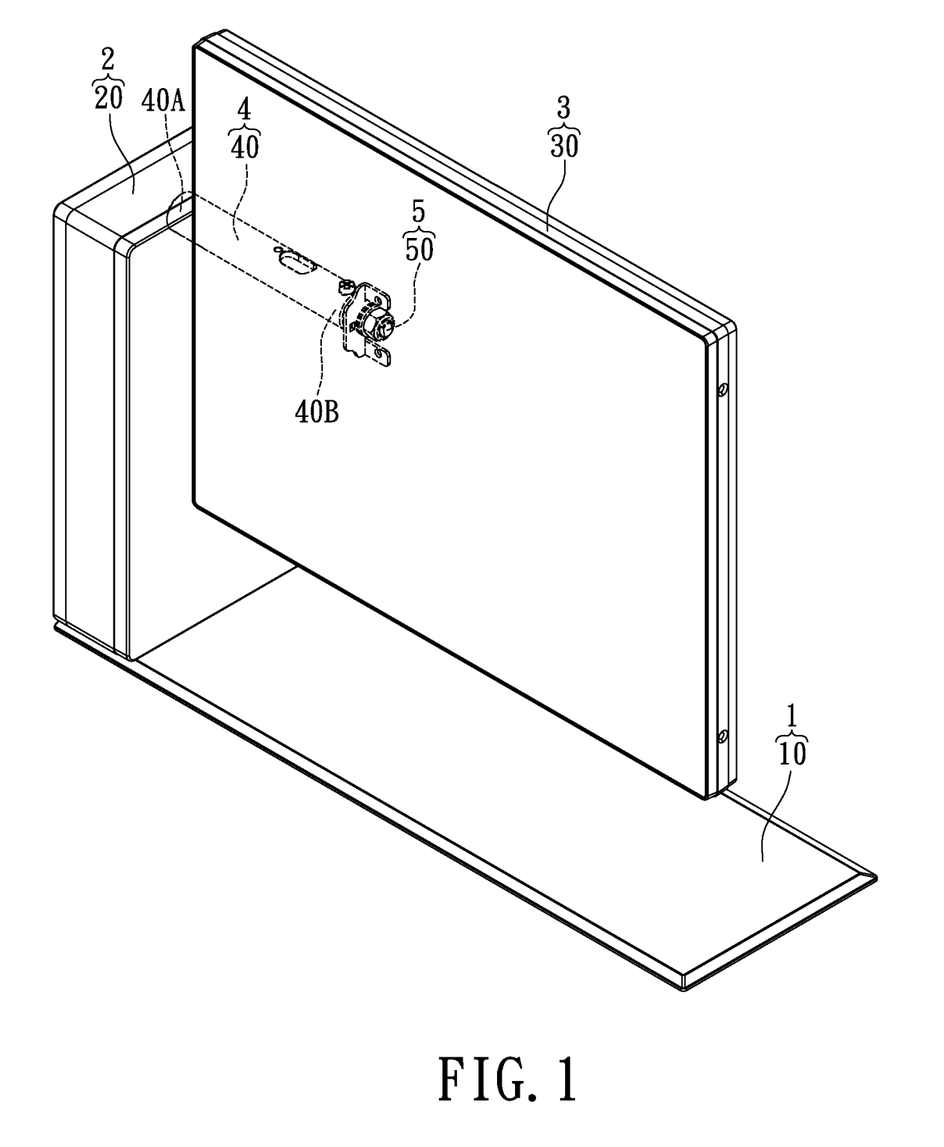
FIG. 1 shows a perspective, schematic view of the horizontal type display device according to the instant disclosure.
Figure 2:
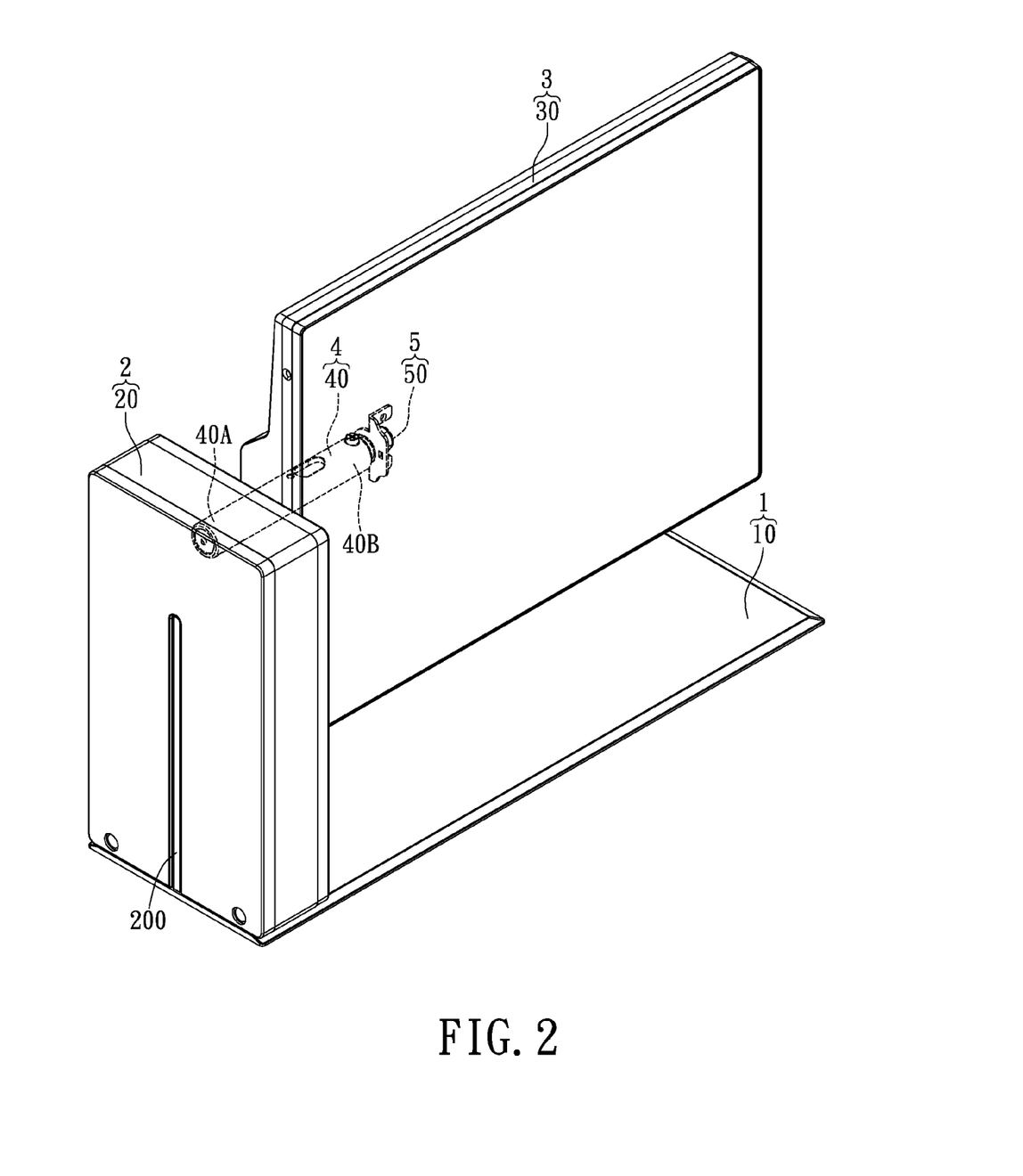
FIG. 2 shows another perspective, schematic view of the horizontal type display device according to the instant disclosure.
Figure 3:
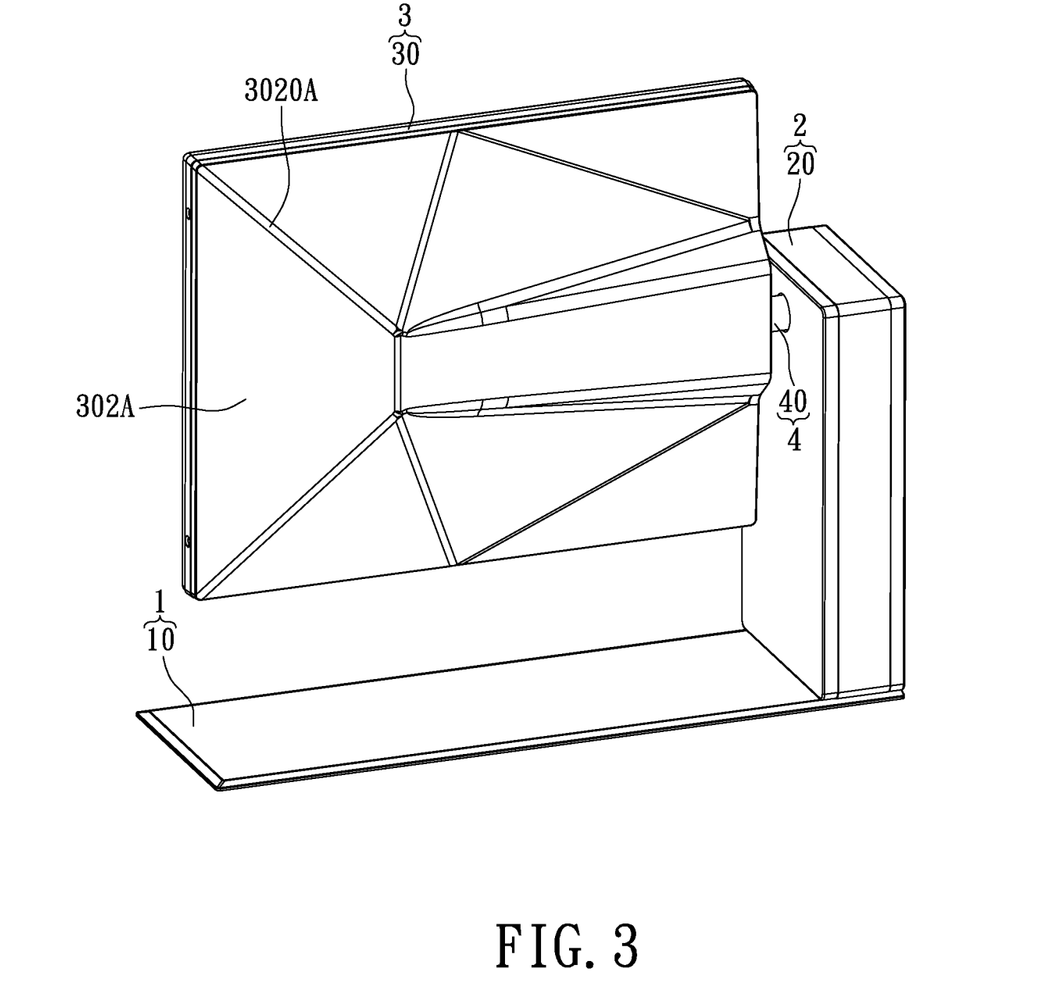
FIG. 3 shows yet another perspective, schematic view of the horizontal type display device according to the instant disclosure.
Figure 4:
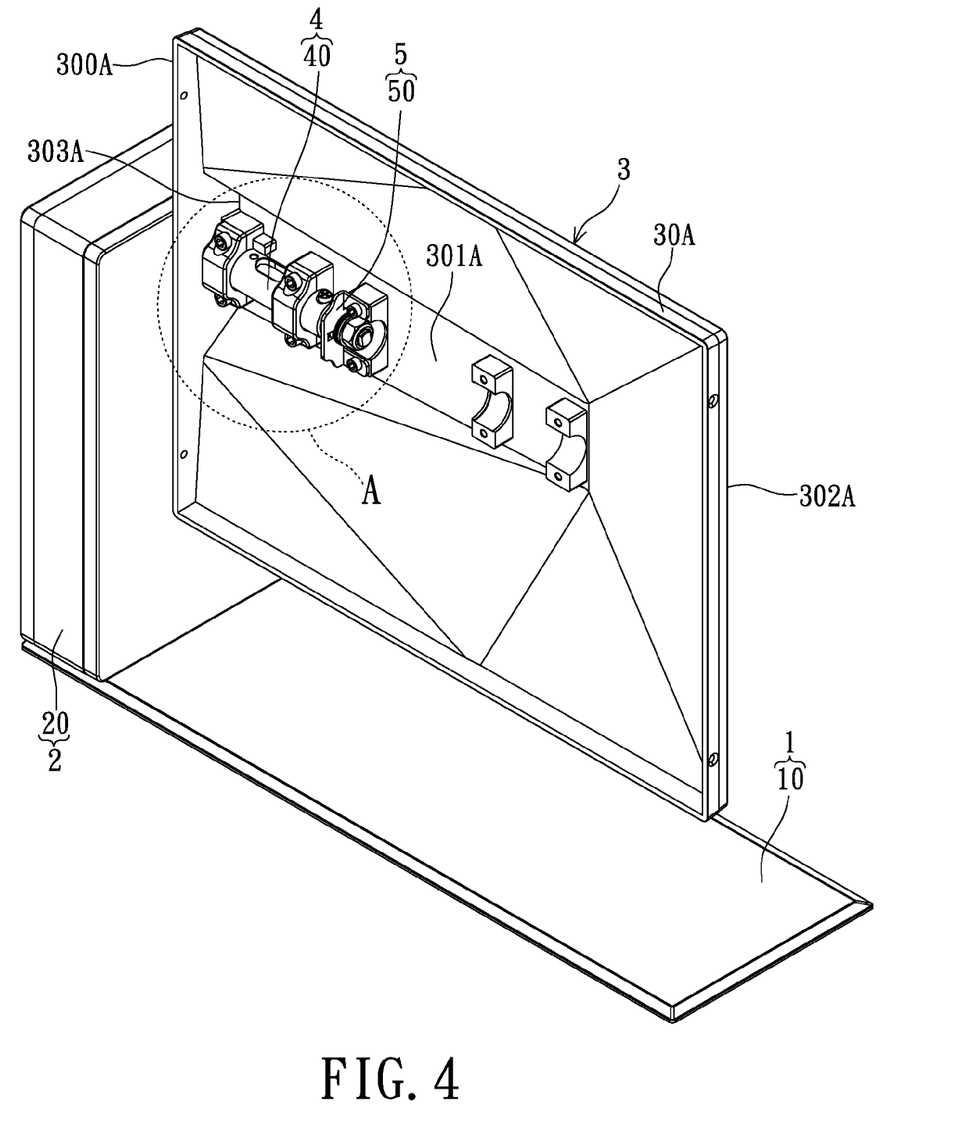
FIG. 4 shows a perspective, schematic view of the display screen connected to the horizontal support structure through hinge structure according to the instant disclosure.

Referring to FIG. 1 to FIG. 3, the base unit 1 includes at least one base body 10. The first support unit 2 includes a vertical support structure 20 vertically disposed on the at least one base body 10. The display unit 3 includes a display screen 30 disposed above the at least one base body 10 and beside the vertical support structure 20, where the display screen 30 is very close to the vertical support structure 20 in order to enhance the aspect of the horizontal type display device. The second support unit 4 includes a horizontal support structure 40 horizontally connected between the vertical support structure 20 and the display screen 40, where the horizontal support structure 40 has a first end portion 40A inserted and fixed in the vertical support structure 20. The hinge unit 5 includes a hinge structure 50 disposed inside the display screen 30 and connected to a second end portion 40B of the horizontal support structure 40, where the display screen 30 is connected to the hinge structure 50, thus the view angle of the display screen 30 relative to the at least one base body 10 is adjustable by using the hinge structure 50. In other words, the display screen 30 can be connected to the horizontal support structure 40 through the hinge structure 50, thus the view angle of the display screen 30 relative to the at least one base body 10 can be adjusted through the hinge structure 50.

For example, referring to FIG. 2, the vertical support structure 20 has a transparent window 200 disposed on the lateral side thereof, thus the user can look the light signal indicators inside the vertical support structure 20 through transparent window 200. Moreover, referring to FIG. 3 and FIG. 4, the display screen 30 may be a liquid crystal display (LCD), and the display screen 30 includes a rear cover 30A. The rear cover 30A has a lateral surface 300A facing the vertical support structure 20 and a receiving groove 301A for receiving one part of the horizontal support structure 40 and the hinge structure 50, and the horizontal support structure 40 passes through the lateral surface 300A of the rear cover 30A. Furthermore, the rear cover 30A has a plurality of inclined surfaces 302A formed on the outer surface of the rear cover 30A, and there is an arc chamfer 3020A formed between every two inclined surface 302A, thus the feeling of touching or rotating the display screen 30 is increased.

Figure 5:
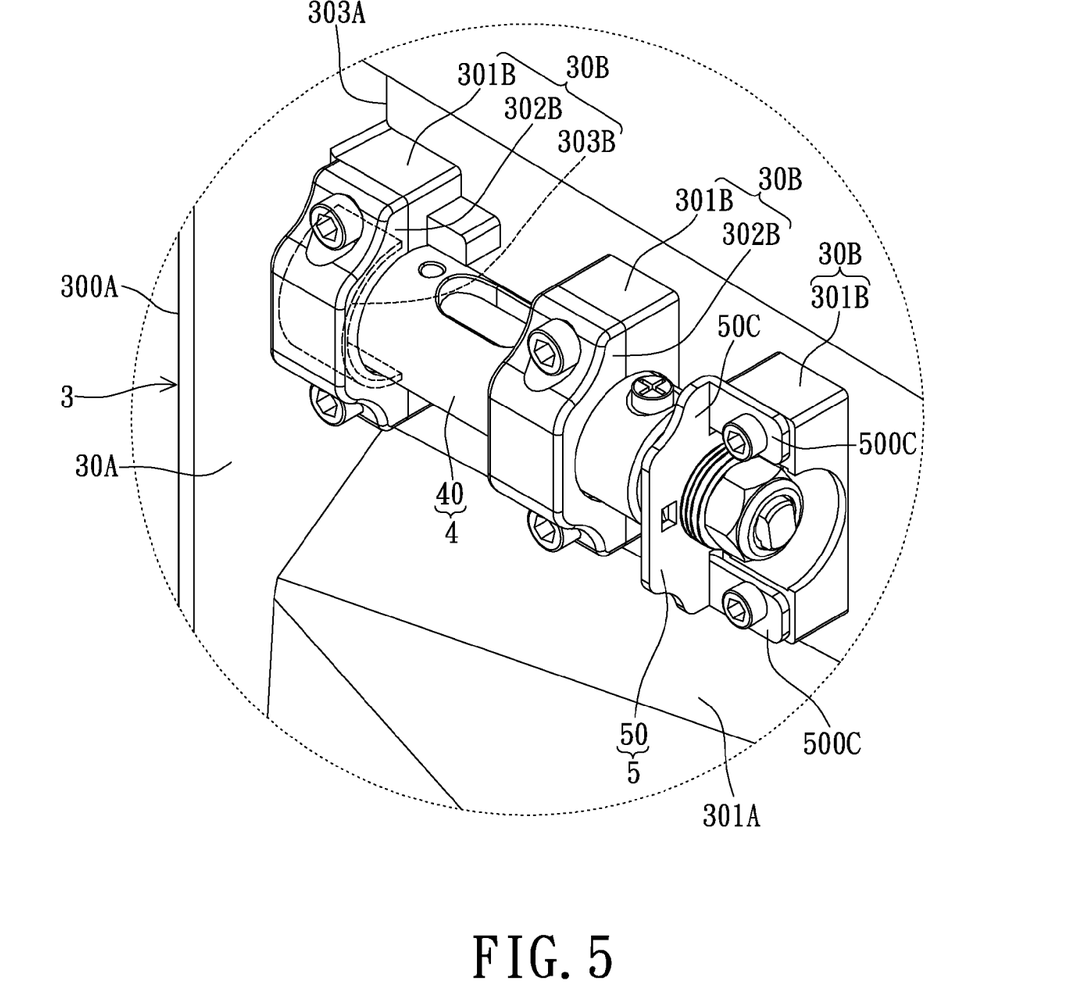
FIG. 5 shows an enlarged view taken on part A of FIG. 4.
Figure 6:
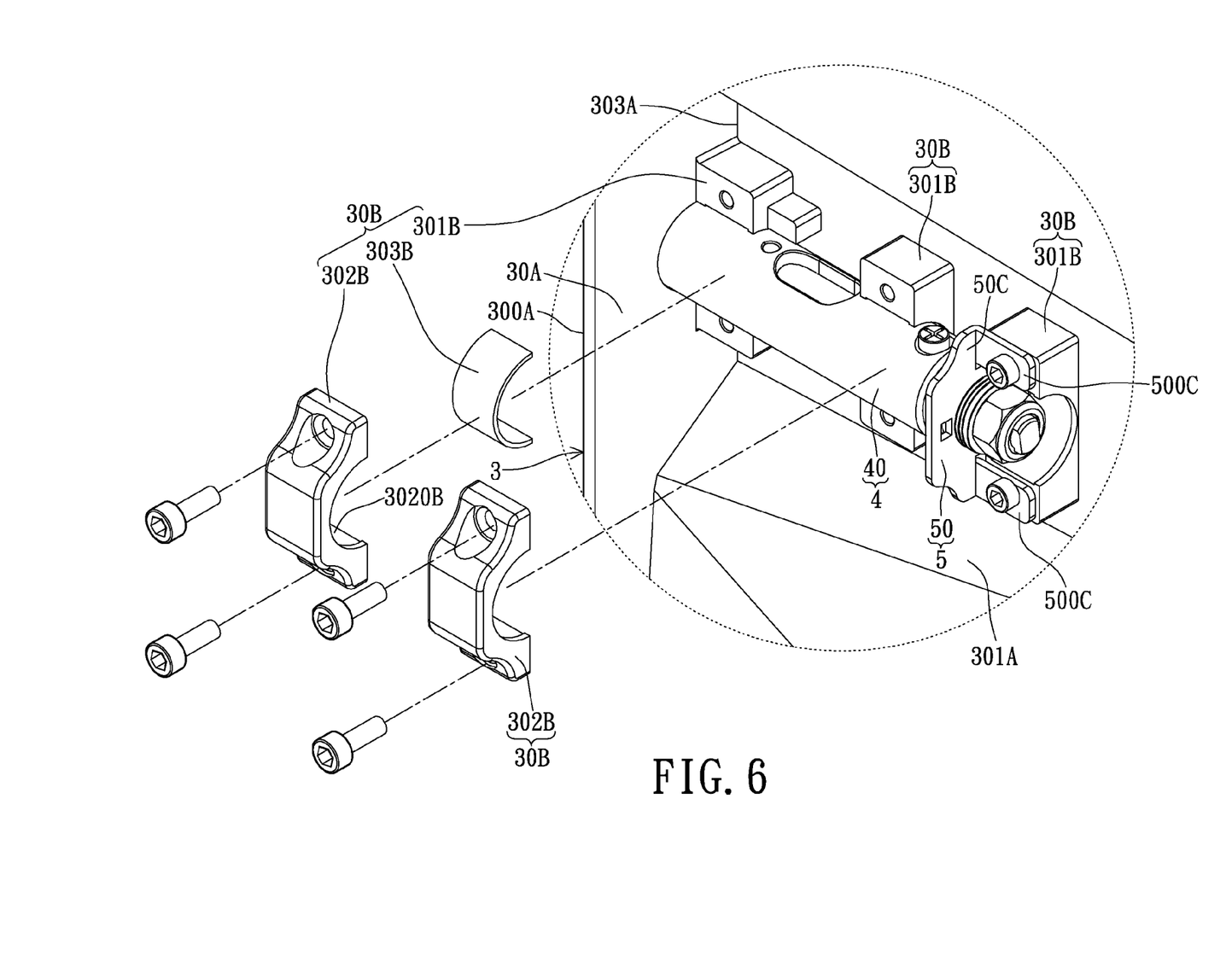
FIG. 6 shows a partial, exploded, schematic view of FIG. 5.

In addition, referring to FIG. 5 and FIG. 6, the display screen 30 includes at least two first positioning components 30B disposed on the inner surface of the rear cover 30A and at least one second positioning component 30B disposed on the inner surface of the rear cover 30A, where the horizontal support structure 40 passes through the at least two first positioning components 30B, and the movable element 50C of the hinge structure 50 has two positioning portions 500C fixed on the at least one second positioning component 30B. Moreover, each first positioning component 30B includes a first C-shaped positioning block 301B disposed on the inner surface of the rear cover 30A and a second C-shaped positioning block 302B fixed on the first C-shaped positioning block 301B, and the at least one second positioning component 30B only includes a first C-shaped positioning block 301B disposed on the inner surface of the rear cover 30A. In addition, one of the at least two first positioning components 30B includes a C-shaped washer 303B disposed between the second C-shaped positioning block 302B and the horizontal support structure 40, where the C-shaped washer 303B can be disposed in the positioning groove 3020B on the inner surface of the second C-shaped positioning block 302B in order to prevent the C-shaped washer 303B from being escaped when rotating the display screen 30. Moreover, one of the at least two first positioning components 30B is adjacent to or very close to the vertical support structure 20 and disposed on a corner position 303A on the inner surface of the rear cover 30A.

Figure 7:
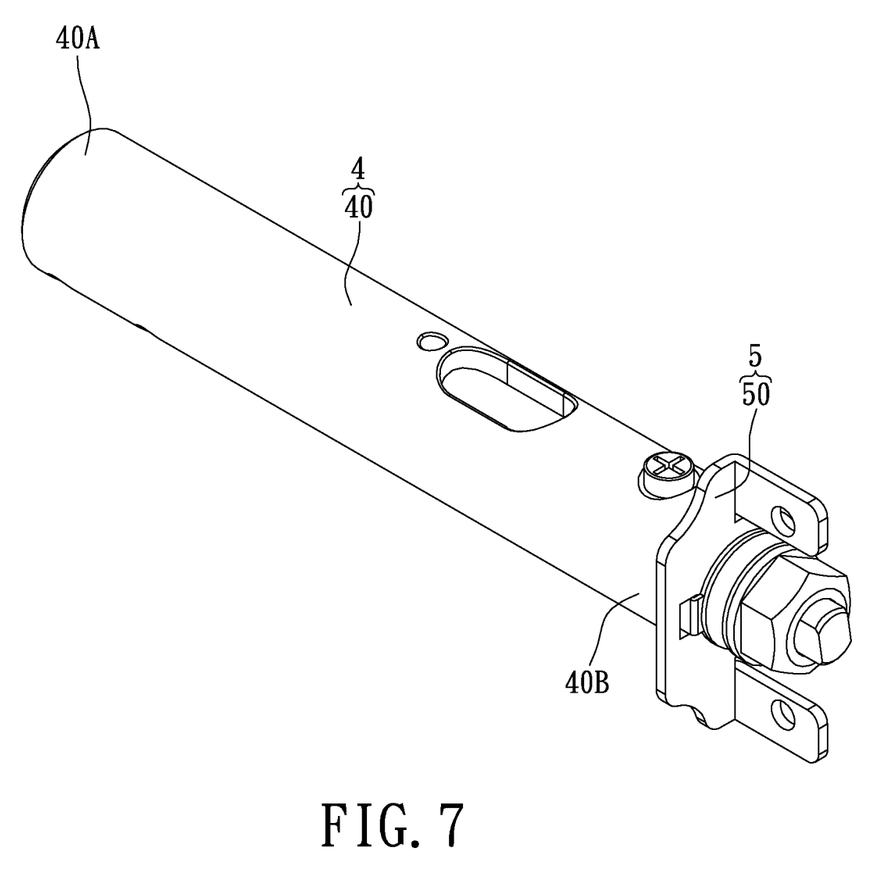
FIG. 7 shows a perspective, assembled, schematic view of the horizontal support structure mated with the hinge structure according to the instant disclosure.
Figure 8:
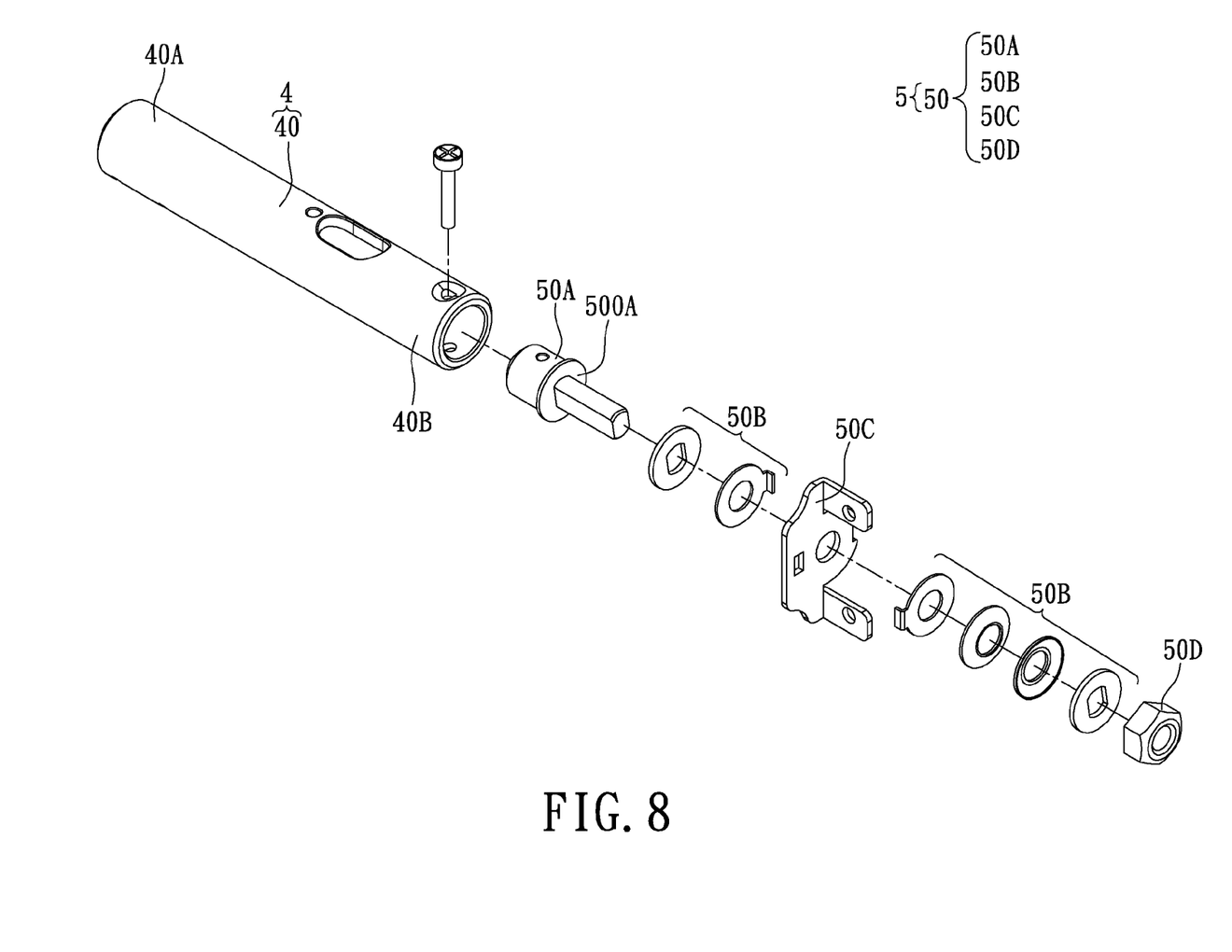
FIG. 8 shows a perspective, exploded, schematic view of the horizontal support structure mated with the hinge structure according to the instant disclosure.

Furthermore, referring to FIG. 7 and FIG. 8, the hinge structure 50 includes a plurality of washers 50B, a movable element 50C disposed between two of the washers 50B, a securing element 50D (such as a screw nut) abutted against the outermost one of the washers 50B, and a fixing element 50A passing through the washers 50B, the movable element 50C and the securing element 50D, and the fixing element 50A has an end portion inserted and fixed in the horizontal support structure 40. The fixing element 50A has a surrounding position-limiting block 500A disposed around the outer surface thereof, and the washers 50B and the movable element 50C are disposed between the surrounding position-limiting block 500A and the securing element 50D.

In other words, the instant disclosure provides a horizontal type display device, comprising: a base unit 1, a first support unit 2, a display unit 3, a second support unit 4 and a hinge unit 5. The base unit 1 includes at least one base body 10. The first support unit 2 includes a vertical support structure 20 vertically disposed on the at least one base body 10. The second support unit 4 includes a horizontal support structure 40 horizontally connected to the vertical support structure 20, where the horizontal support structure 40 has a first end portion 40A inserted and fixed in the vertical support structure 20. The hinge unit 5 includes a hinge structure 50 connected to a second end portion 40B of the horizontal support structure 40. The display unit 3 includes a display screen 30 enclosing one part of the horizontal support structure 40 and the hinge structure 50, where the display screen 30 is connected to the hinge structure 50 and the horizontal support structure 40, and the view angle of the display screen 50 relative to the at least one base body 10 can be adjustable by using the hinge structure 50.

In conclusion, the horizontal support structure is horizontally connected between the vertical support structure and the display screen and the hinge structure is disposed inside the display screen and connected to a second end portion of the horizontal support structure, thus the view angle of the display screen relative to the at least one base body can be adjusted by using the hinge structure according to different requirements.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:
1. A horizontal type display device, comprising:
   a base body;
   a first support structure disposed on the base body;
   a display screen having a front surface, a rear surface opposite to the front surface, a bottom side facing the base body, a top side opposite to the bottom side, a first lateral side facing the first support structure, and a second lateral side opposite to the first lateral side, wherein the bottom side, the top side, the first lateral side and the second lateral side are connected with each other to form a surrounding peripheral surface connected between the front surface and the rear surface;

a second support structure disposed on the first support structure, wherein the second support structure has a first portion inserted into the first support structure, a second portion passing through the first lateral side of the display screen and inserted into the display screen, and a third portion connected between the first portion and the second portion and exposedly disposed between the first support structure and the display screen; and a hinge structure connected to the second portion of the second support structure and disposed inside the display screen, wherein the display screen is pivotally connected to the second portion of the second support structure through the hinge structure;

wherein the display screen includes a rear cover, at least two first positioning components disposed on an inner surface of the rear cover, and at least one second positioning component disposed on the inner surface of the rear cover;

wherein the second portion of the second support structure passes through the at least two first positioning components, and the hinge structure is disposed on the at least one second positioning component;

wherein each first positioning component includes a first C-shaped positioning block disposed on the inner surface of the rear cover and a second C-shaped positioning block disposed on the first C-shaped positioning block for holding the second portion of the second support structure, and the at least one second positioning component includes a third C-shaped positioning block disposed on the inner surface of the rear cover for connecting the hinge structure with the display screen.

2. The horizontal type display device of claim 1, wherein one of the at least two first positioning components includes a C-shaped washer disposed between the corresponding second C-shaped positioning block and the second portion of the second support structure.

3. The horizontal type display device of claim 1, wherein one of the at least two first positioning components is adjacent to the first support structure and disposed on a corner position on the inner surface of the rear cover.

4. A horizontal type display device, comprising:
a display screen having a front surface, a rear surface opposite to the front surface, a bottom side, a top side opposite to the bottom side, a first lateral side, and a second lateral side opposite to the first lateral side, wherein the bottom side, the top side, the first lateral side and the second lateral side are connected with each other to form a surrounding peripheral surface connected between the front surface and the rear surface;

a support structure having a first portion, a second portion passing through the first lateral side of the display screen and inserted into the display screen, and a third portion connected between the first portion and the second portion and exposed from the display screen; and a hinge structure connected to the second portion of the support structure and disposed inside the display screen, wherein the display screen is pivotally connected to the second portion of the support structure through the hinge structure;

wherein the display screen includes a rear cover, at least two first positioning components disposed on an inner surface of the rear cover, and at least one second positioning component disposed on the inner surface of the rear cover.

5. The horizontal type display device of claim 4, wherein the second portion of the support structure passes through the at least two first positioning components, and the hinge structure is disposed on the at least one second positioning component.

6. The horizontal type display device of claim 5, wherein each first positioning component includes a first C-shaped positioning block disposed on the inner surface of the rear cover and a second C-shaped positioning block disposed on the first C-shaped positioning block for holding the second portion of the support structure, and the at least one second positioning component includes a third C-shaped positioning block disposed on the inner surface of the rear cover for connecting the hinge structure with the display screen.

7. The horizontal type display device of claim 6, wherein one of the at least two first positioning components includes a C-shaped washer disposed between the corresponding second C-shaped positioning block and the second portion of the support structure.

8. The horizontal type display device of claim 4, wherein one of the at least two first positioning components is disposed on a corner position on the inner surface of the rear cover.

* * * * *